(12) United States Patent
Wohlers et al.

(10) Patent No.: US 10,964,128 B2
(45) Date of Patent: Mar. 30, 2021

(54) RESOURCE REDUCTION IN ADDRESS VALIDATION

(71) Applicant: ADP, LLC, Roseland, NJ (US)

(72) Inventors: Robert Wohlers, Castro Valley, CA (US); Kurt Newman, Columbus, GA (US); Debashis Ghosh, Charlotte, NC (US)

(73) Assignee: ADP, LLC, Roseland, NJ (US)

( * ) Notice: Subject to any disclaimer, the term of this patent is extended or adjusted under 35 U.S.C. 154(b) by 340 days.

(21) Appl. No.: 16/047,671

(22) Filed: Jul. 27, 2018

(65) Prior Publication Data
US 2020/0035043 A1 Jan. 30, 2020

(51) Int. Cl.
*G07B 17/00* (2006.01)
*G06Q 10/08* (2012.01)

(52) U.S. Cl.
CPC ..... *G07B 17/00435* (2013.01); *G06Q 10/083* (2013.01); *G07B 2017/00443* (2013.01); *G07B 2017/00451* (2013.01)

(58) Field of Classification Search
CPC .... G07B 17/00435; G07B 2017/00443; G07B 2017/00451; G06Q 10/083
See application file for complete search history.

(56) References Cited

U.S. PATENT DOCUMENTS

| | | | |
|---|---|---|---|
| 5,305,196 A | 4/1994 | Deaton et al. | |
| 6,457,012 B1* | 9/2002 | Jatkowski | G06Q 10/08 707/756 |
| 7,236,970 B1 | 6/2007 | Winslow | |
| 8,285,656 B1 | 10/2012 | Chang et al. | |
| 9,064,285 B1* | 6/2015 | Nathoo | G06Q 10/1053 |
| 2002/0072997 A1* | 6/2002 | Colson | G06Q 10/10 705/52 |
| 2004/0225670 A1* | 11/2004 | Cameron | G06F 16/282 |
| 2005/0021551 A1 | 1/2005 | Silva et al. | |
| 2009/0063490 A1* | 3/2009 | Fuerst | G06F 16/24 |
| 2012/0260187 A1* | 10/2012 | Berger | G06Q 10/109 715/738 |

(Continued)

OTHER PUBLICATIONS

Cercone, Nick, Boates, John, and Krause, Max, "An Interactive System for Finding Perfect Hash Functions," IEEE Software, Nov. 1985, pp. 38-53.*

(Continued)

*Primary Examiner* — Nathan Erb
(74) *Attorney, Agent, or Firm* — Yee & Associates, P.C.

(57) ABSTRACT

A method and apparatus for reducing an amount of resources required for address validation. An address validation program running on a processor unit configures a tax information table in a payroll database to have an authorization column indicating whether an employee having data in a row of the tax information table has authorized release of data in the row; receives a validation request for at least one validated address entered in one or more request fields in a graphical user interface connected to the processor unit; searches only rows having an indication of authorization in the authorization column of the tax information table; and responsive to finding at least one current address in the tax information table, displays the at least one current address in one or more response fields of the graphical user interface as the at least one validated address.

17 Claims, 11 Drawing Sheets

| | AUTH | RAPID | FIRST | MIDDLE | LAST | ADDRESS | Old1 | Old2 |
|---|---|---|---|---|---|---|---|---|
| 1026 | X | 57 | JOHN | Z. | DOE | | | |
| | | | JACK | L. | SMITH | | | |
| 1028 | X | 42 | HENRY | C. | BLANK | | | |
| 1030 | X | 71 | SALLY | E. | JONES | | | |
| | | | BERT | W. | FRANK | | | |
| | | | GARY | A. | POST | | | |
| 1032 | X | 70 | ELIZABETH | D. | WILEY | | | |
| 1034 | X | 64 | TED | F. | BROWN | | | |
| | | | MEGAN | I. | GREEN | | | |

1000 / 1002 1004 1006 1008 1010 1014 1022 1024

(56) References Cited

U.S. PATENT DOCUMENTS

2015/0332218 A1* 11/2015 Krause .................. G06Q 10/10
                                                         705/27.1
2016/0034692 A1*  2/2016 Singler ................. G06F 16/27
                                                          726/26
2016/0164859 A1*  6/2016 Vidal ................... H04L 63/083
                                                          705/37

OTHER PUBLICATIONS

Semer, Lance J., "Address standardization techniques," Internal Auditor, 54.n5, p. 17(3), Institute of Internal Auditors, Inc., Oct. 1997.*
Gould, "9 Ways to Keep your Direct Mail Data Up-To-Date," Target Marketing, dated Mar. 8, 2018, accessed May 29, 2018, 8 pages, http://www.targetmarketingmag.com/post/9-ways-to-keep-your-direct-mail-data-up-to-date/.
AccuMail frameworks, Datatech SmartSoft Inc., 2009, 4 pages.

* cited by examiner

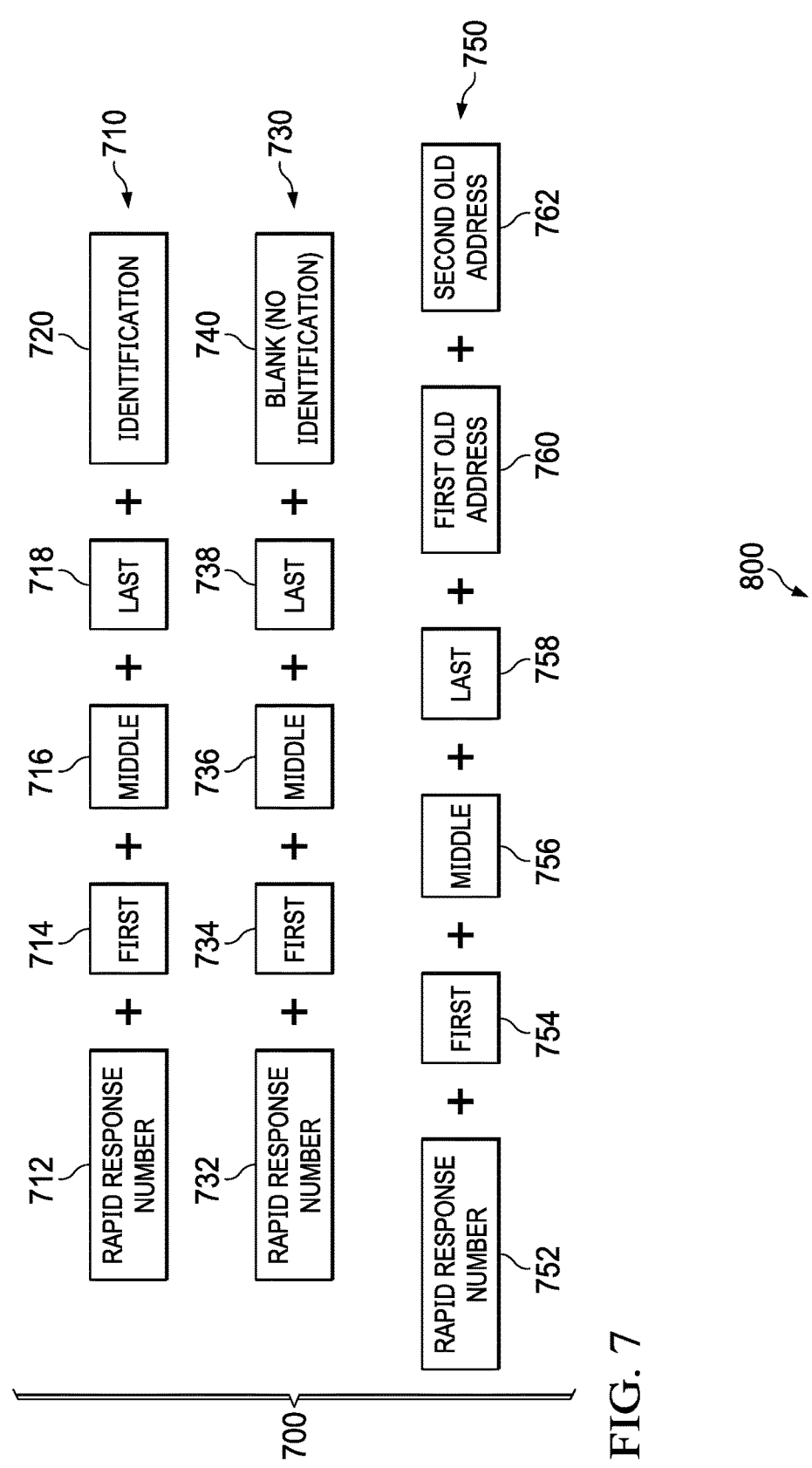

EXAMPLES: 900

910 — JOHN Z. DOE
JOH=10+15+8=33
DOE=4+15+5=24
24+33=57

920 — HENRY C. BLANK
HEN=8+5+14=27
BLA=2+12+1=15
27+15=42

930 — SALLY E. JONES
SAL=19+1+12=32
JON=10+15+14=39
32+39=71

940 — ELIZABETH D. WILEY
ELI=5+12+9=26
WIL=23+9+12=44
26+44=70

950 — TED F. BROWN
TED=20+5+4=29
BRO=2+18+15=35
29+35=64

| | AUTH | RAPID | FIRST | MIDDLE | LAST | ADDRESS | Old1 | Old2 |
|---|---|---|---|---|---|---|---|---|
| 1026 | X | 57 | JOHN | Z. | DOE | | | |
| | | | JACK | L. | SMITH | | | |
| 1028 | X | 42 | HENRY | C. | BLANK | | | |
| 1030 | X | 71 | SALLY | E. | JONES | | | |
| | | | BERT | W. | FRANK | | | |
| | | | GARY | A. | POST | | | |
| 1032 | X | 70 | ELIZABETH | D. | WILEY | | | |
| 1034 | X | 64 | TED | F. | BROWN | | | |
| | | | MEGAN | I. | GREEN | | | |

Column labels: 1002 AUTH, 1004 RAPID, 1006 FIRST, 1008 MIDDLE, 1010 LAST, 1014 ADDRESS, 1022 Old1, 1024 Old2

FIG. 10

RESOURCE REDUCTION IN ADDRESS VALIDATION

BACKGROUND INFORMATION

1. Field

The present disclosure relates generally to a special computer system for validating addresses and, in particular, to a method and apparatus for reducing an amount of resources required for validating addresses on demand and for providing validated address lists on demand.

2. Background

A basic method of informing others of a person's address change has been to provide the United States Post Office with a completed National Change of Address (NCOA) form. Companies who provide direct mail advertising have historically relied upon the Post Office's NCOA form and, to a lesser degree, cable service companies. However, the use of the NCOA form has declined and is continuing to decline. Moreover, usage of cable service companies is also in decline.

Errors in mailing addresses are costly in a number of ways. First, a direct mail advertising company must pay for postage for advertising that may not reach an intended recipient. Second, a size of mailing must be increased to account for an amount of undelivered mail or mail that is delivered to an incorrect address. Third, no information is available to the direct mail advertising company regarding changes in an economic status of an addressee. Such changes may be evident in a change of zip code or in information linked to a recipient's address such as a salary range. Fourth, a large amount of computational resources may be wasted in inefficient attempts to cross-check address lists and to determine which addresses have changed and which addresses are current addresses. In addition, storage resources are wasted in holding data that is compromised by an unknown percentage of incorrect data.

Therefore, it would be desirable to have a method and apparatus that take into account at least some of the issues discussed above, as well as other possible issues. For example, it would be desirable to have a method and apparatus that overcome a technical problem with reducing an amount of resources required for mailing address validation.

SUMMARY

An embodiment of the present disclosure provides a computer-implemented method for reducing an amount of resources required for address validation. The computer-implemented method configures, by an address validation program running on a processor unit, a tax information table in a payroll database to have an authorization column indicating whether an employee having data in a row of the tax information table has authorized release of data in the row; receives, by an address validation program running on a processor unit, a validation request for at least one validated address entered in one or more request fields in a graphical user interface connected to the processor unit; searches, by the address validation program running on the processor unit, only rows having an indication of authorization in the authorization column of the tax information table; and responsive to finding at least one current address in the tax information table, displaying, by the address validation program running on the processor unit, the at least one current address in one or more response fields of the graphical user interface as the at least one validated address.

Another embodiment of the present disclosure provides an apparatus for reducing an amount of resources required for address validation comprising: a computer system connected to a network, a graphical user interface, a processor unit and a payroll database having a tax information table; and computer program instructions stored in a computer-readable storage medium and configured to cause the processor unit to configure a tax information table in a payroll database to have an authorization column indicating whether an employee having data in a row of the tax information table has authorized release of data in the row; to receive a validation request for at least one validated address entered in one or more request fields in a graphical user interface connected to the processor unit; to search only rows having an indication of authorization in the authorization column of the tax information table; and responsive to finding the at least one validated addresses in the tax information table, to display a current address in one or more response fields of the graphical user interface as the at least one validated address.

A further embodiment of the present invention provides a computer program product for reducing an amount of resources required for address validation comprising: computer program instructions stored in a computer-readable storage medium and configured to cause a processor unit to configure a tax information table in a payroll database to have an authorization column indicating whether an employee having data in a row of the tax information table has authorized release of data in the row; computer program instructions stored in the computer-readable storage medium and configured to cause the processor unit to receive a validation request for at least one validated address entered in one or more request fields in a graphical user interface connected to the processor unit; computer program instructions stored in the computer-readable storage medium and configured to cause the processor unit to search only rows having an indication of authorization in the authorization column of the tax information table; and computer program instructions stored in the computer-readable storage medium and configured to cause the processor unit, responsive to finding the at least one validated addresses in the tax information table, to display a current address in one or more response fields of the graphical user interface as the at least one validated address.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof, will best be understood by reference to the following detailed description of an illustrative embodiment of the present disclosure when read in conjunction with the accompanying drawings, wherein:

FIG. 7 is an illustration of a number of validation request formats in accordance with an illustrative embodiment;

FIG. 8 is an illustration of a code table for validation requests in accordance with an illustrative embodiment;

FIG. 9 is an illustration of a number of examples for calculating a rapid response code for inclusion in a validation request in accordance with an illustrative embodiment;

FIG. 10 is an illustration of an augmented tax table in accordance with an illustrative embodiment;

DETAILED DESCRIPTION

Figure 1:
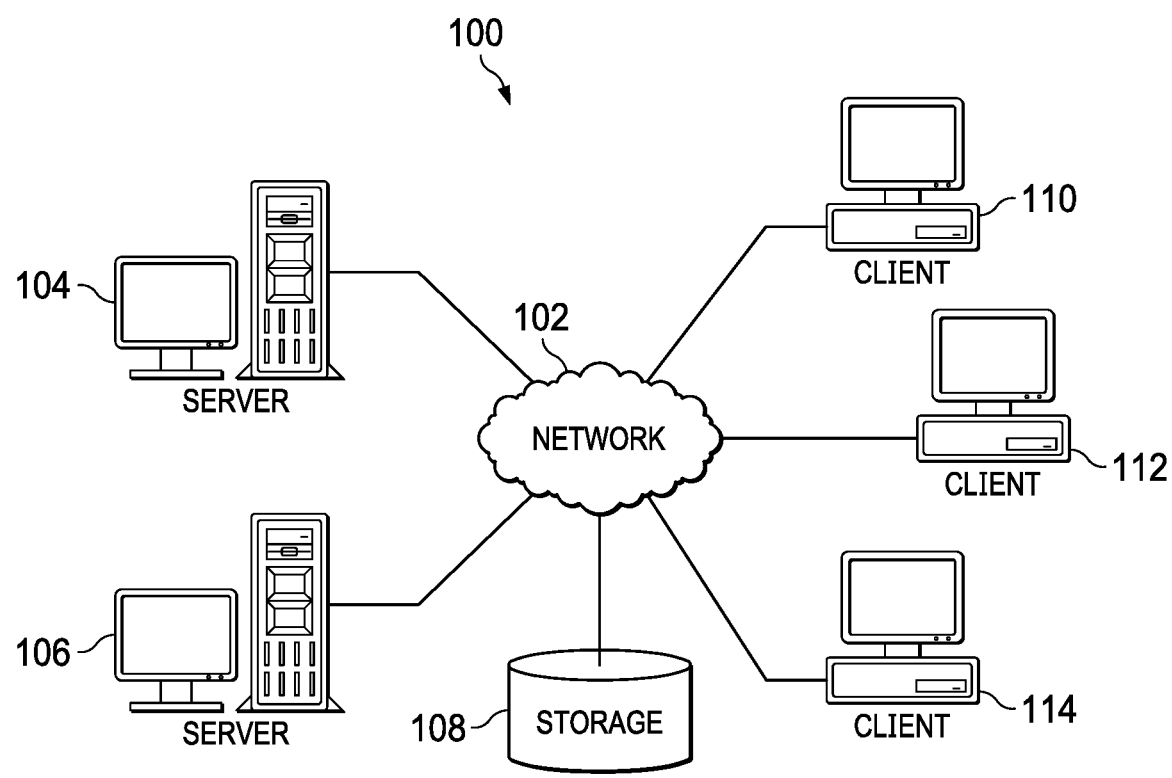
FIG. 1 is an illustration of an information environment in accordance with an illustrative embodiment.

The illustrative embodiments recognize and take into account one or more different considerations. The illustrative embodiments recognize and take into account that direct mail advertising may send direct mail to incorrect addresses and to multiple addresses for the same person. The illustrative embodiments recognize and take into account that efforts by direct mail companies to obtain correct addresses may be costly and time-consuming.

The illustrative embodiments recognize and take into account that employees must file their taxes, and to do that, the employees must ensure that their employer has a correct address for the employee's W-2 form. The illustrative embodiments recognize and take into account that companies that provide payroll services maintain databases with tables from which forms such as W-2 tax forms are prepared.

The illustrative embodiments recognize and take into account that payroll data contains address information for payees, and that the payroll data may be used to enable companies to check and verify addresses. The illustrative embodiments recognize and take into account that companies which provide payroll services may use the payroll data to provide updated addresses for individuals to outside entities.

The illustrative embodiments recognize and take into account that companies which provide payroll services may use payroll data to provide validated address lists to direct mail marketing companies. The illustrative embodiments recognize and take into account that providing the validated address lists may reduce an amount of resources needed to reach a number of individuals.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in reverse order, depending upon the functionality involved. Also, other blocks may be added, in addition to the illustrated blocks, in a flowchart or block diagram.

As used herein, the phrase "at least one of," when used with a list of items, means different combinations of one or more of the listed items may be used and only one of each item in the list may be needed. In other words, "at least one of" means any combination of items and number of items may be used from the list, but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A, one of item B, and ten of item C; four of item B and seven of item C; or other suitable combinations.

With reference now to the figures and, in particular, with reference to FIG. 1, an illustration of a diagram of a data processing environment is depicted in accordance with an illustrative embodiment. It should be noted that FIG. 1 is only provided as an illustration of one implementation and is not intended to imply any limitation with regard to the environments in which the different embodiments may be implemented. Many modifications to the depicted environments may be made.

The computer-readable program instructions may also be loaded onto a computer, a programmable data processing apparatus, or other device to cause a series of operational steps to be performed on the computer, programmable apparatus or other device to produce a computer implemented process, such that the instructions which execute on a computer, programmable apparatus, or other device implement the functions and/or acts specified in the flowchart and/or block diagram block or blocks.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client computers include client computer 110, client computer 112, and client computer 114. Client computer 110, client computer 112, and client computer 114 connect to network 102. These connections can be wireless or wired connections depending on the implementation. Client computer 110, client computer 112, and client computer 114 may be, for example, personal computers or network computers. In the depicted example, server computer 104 provides information, such as boot files, operating system images, and applications to client computer 110, client computer 112, and client computer 114. Client computer 110, client computer 112, and client computer 114 are clients to server computer 104 in this example. Network data processing system 100 may include additional server computers, client computers, and other devices not shown.

Program code located in network data processing system 100 may be stored on a computer-recordable storage medium and downloaded to a data processing system or other device for use. For example, program code may be stored on a computer-recordable storage medium on server computer 104 and downloaded to client computer 110 over network 102 for use on client computer 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented as a number of different types of networks, such as, for example, an intranet, a local area network (LAN), or a wide area network (WAN). FIG. 1 is intended as an example, and not as an architectural limitation for the different illustrative embodiments.

The illustration of network data processing system 100 is not meant to limit the manner in which other illustrative embodiments can be implemented. For example, other client computers may be used in addition to or in place of client computer 110, client computer 112, and client computer 114 as depicted in FIG. 1. For example, client computer 110, client computer 112, and client computer 114 may include a tablet computer, a laptop computer, a bus with a vehicle computer, and other suitable types of clients.

In the illustrative examples, the hardware may take the form of a circuit system, an integrated circuit, an application-specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, programmable array logic, a field programmable logic array, a field programmable gate array, and other suitable hardware devices. Additionally, the processes may be implemented in organic components integrated with inorganic components and may be comprised entirely of organic components, excluding a human being. For example, the processes may be implemented as circuits in organic semiconductors.

Figure 2:
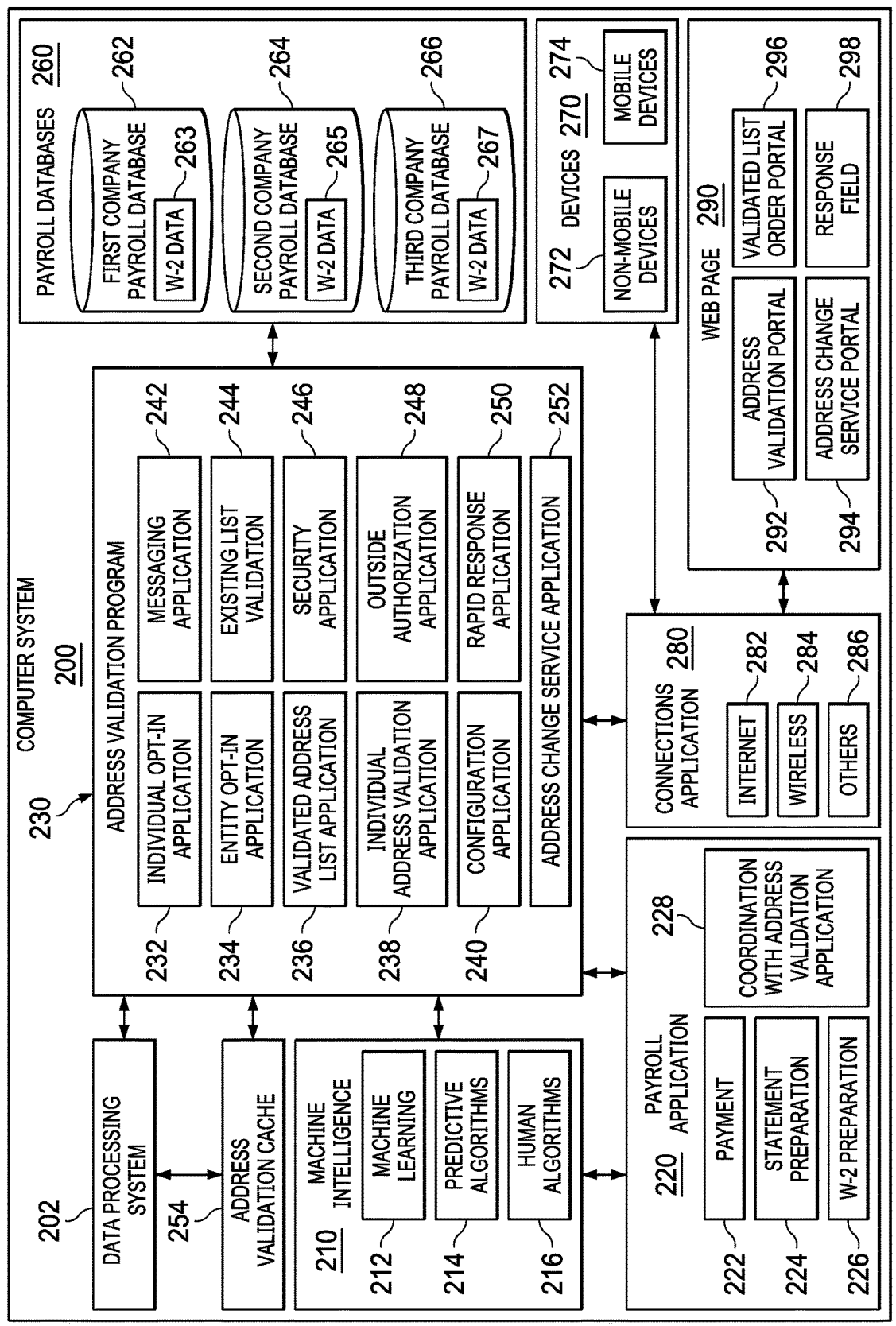
FIG. 2 is a block diagram of a computer system for reducing an amount of resources required for address validation in accordance with an illustrative embodiment.

Turning to FIG. 2, a block diagram of a computer system is depicted in accordance with an illustrative embodiment. Computer system 200 may operate within a network such as network 102 in FIG. 1 and may use computers such as server computer 104, server computer 106, client computer 110, client computer 112, and client computer 114 in FIG. 1. Computer system 200 may also operate using a data processing system such as data processing system 1800 in FIG. 18. However, computer system 200 has a number of components that are configured to cause a processor unit, such as processor unit 1804 in FIG. 18, to perform tasks that a standard computer system cannot perform. Specifically, computer system 200 is made special by address validation program 230, machine intelligence 210, and the connection of data processing system 202 to payroll application 220, payroll databases 260, and devices 270. Moreover, the foregoing special components of computer system 200 operate with instructions provided by programs such as address validation program 230 to perform algorithms as described in flowcharts in FIGS. 11-17.

Computer system 200 comprises data processing system 202, machine intelligence 210, payroll application 220, address validation program 230, payroll databases 260, devices 270, connections application 280, and web page 290. Data processing system 202 may be data processing system 1800 in FIG. 18. Machine intelligence 210, payroll application 220, and address validation program 230 may run on a processor unit such as processor unit 1804 in FIG. 18. Machine intelligence 210 comprises machine learning 212, predictive algorithms 214 and human algorithms 216. In this illustrative example, machine intelligence 210 can be implemented using one or more systems such as an artificial intelligence system, a neural network, a Bayesian network, an expert system, a fuzzy logic system, a genetic algorithm, or other suitable types of systems. Machine intelligence 210 may be used to analyze performance of computer system 200 and address validation program 230 and make recommendations on improvements in reducing processing time and usage of memory and storage space. Machine learning 212 may monitor applications such as address validation program 230 and payroll application 220 to learn historical data regarding processor usage, memory usage, storage usage, and bandwidth usage to identify computational improvements. Predictive algorithms 214 may predict usage of computer system 200 based on input from machine learning 212. Human algorithms 216 may analyze configuration inputs and effects of these inputs on processors, memory usage, storage usage, and bandwidth usage.

Address validation program 230 comprises a number of applications, such as individual opt-in application 232, entity opt-in application 234, validated address list application 236, individual address validation application 238, configuration application 240, messaging application 242, existing list validation 244, security application 246, outside authorization application 248, rapid response application 250, and address change service application 252.

Figure 3:
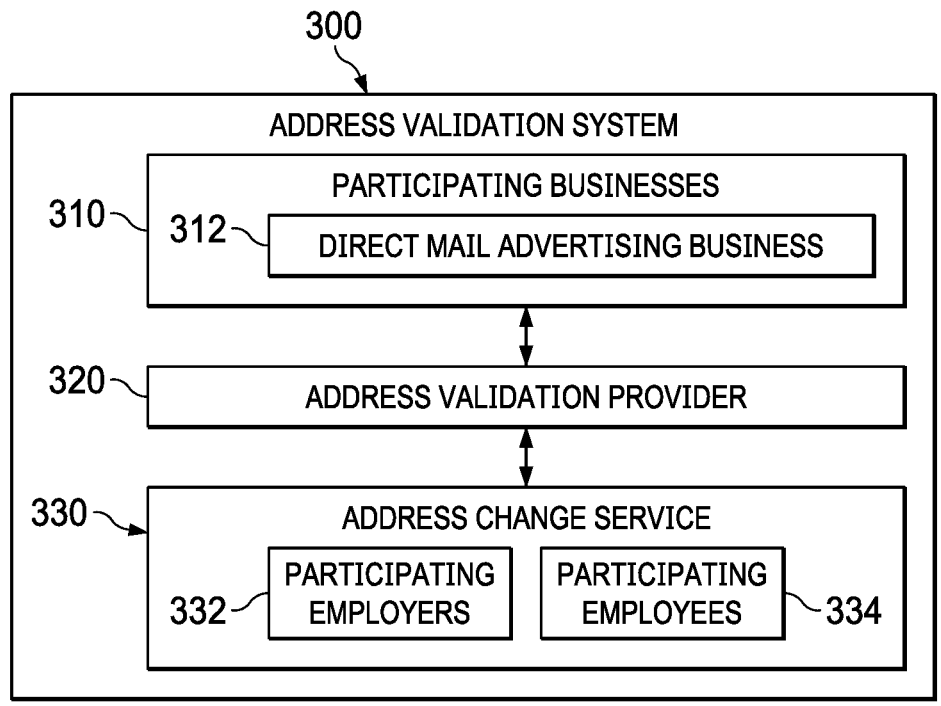
FIG. 3 is a block diagram of an address validation system in accordance with an illustrative embodiment.

Individual opt-in application 232 may allow employees of entities that have opted-in to an address validation service offered by address validation program 230, such as address validation provider 320 in FIG. 3, to opt-in to an authorized use of the employee's payroll data for use by computer system 200 for address validation services. An employee that opts-in using individual opt-in application 232 may have an authorization indication placed in an authorization column of a tax table containing the employee's payroll data. The authorization indication may be as shown in authorization column 1002 in FIG. 10.

Entity opt-in application 234 may allow an entity having payroll services provided by payroll application 220 and having data in a payroll database in payroll databases 260 to permit computer system 200 to offer address validation services to either entities having payroll data in payroll database 260 or to entities that do not have payroll data in payroll database 260, but that have been authorized by outside authorization application 248. In an illustrative example, a first company may have first company payroll data in first company payroll database 262. By opting-in using entity opt-in application 234, the first company may allow computer system 200 to provide address validation services to a second company having second company payroll database 264 or a third company having third company payroll database 266 that may access first company payroll database 262. Furthermore, opting-in by an entity may allow computer system 200 to provide address validation services to an outside entity that has been authorized by outside authorization application 248.

Figure 4:
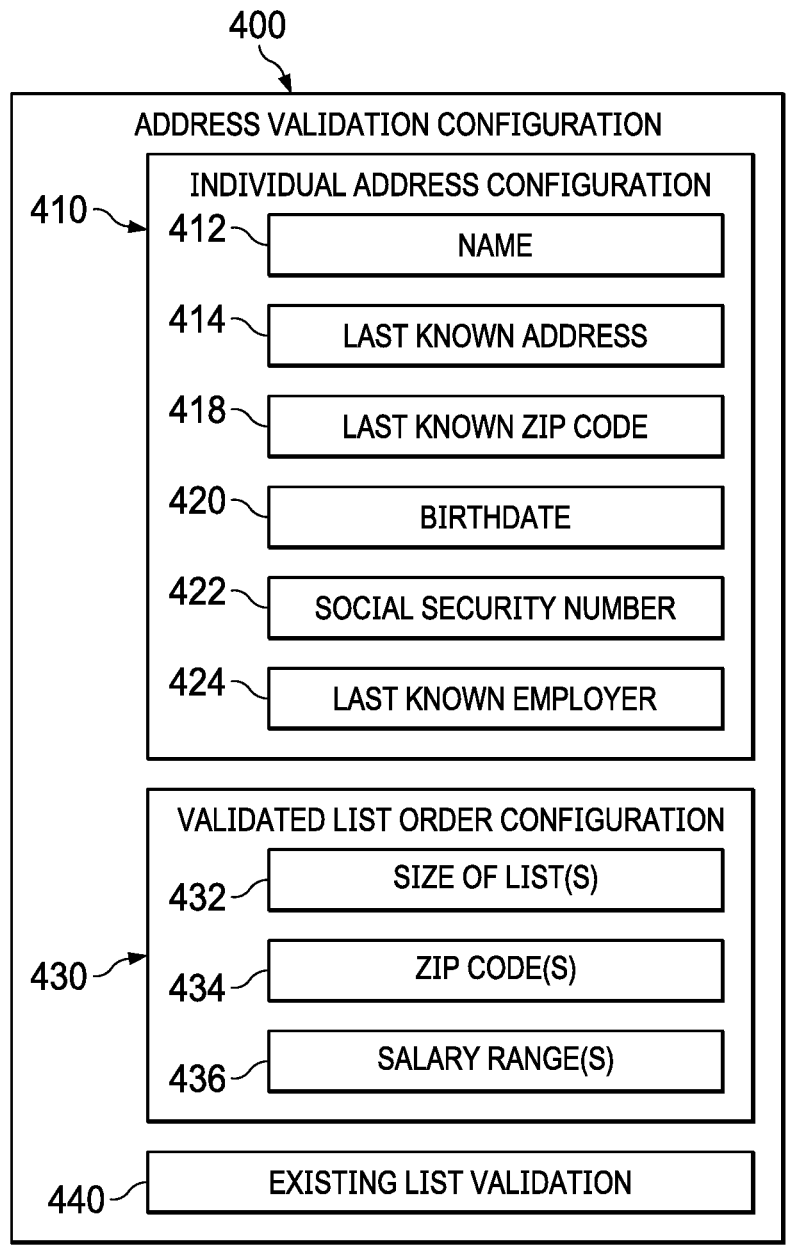
FIG. 4 is a block diagram of a request for an address validation configuration web page in accordance with an illustrative embodiment.

Validated address list application 236 may receive data from web page 290 and deliver individual address validations or validated address lists to a requestor in accordance with requests configured by a web screen for data entry such as address validation configuration 400 in FIG. 4. Validated address list application 236 may run process 1200 in FIG. 12 in response to validated list order configuration 430 in FIG. 4. Individual address validation application 238 receives data from configuration application 240 and runs process 1100 in FIG. 11 in response to one or more entries in individual address configuration 410 in FIG. 4.

Configuration application 240 receives data from web page 290. Data received from web page 290 may be from address validation portal 292, address change service portal 294, and validated list order portal 296. Data received by configuration application 240 may be data from address validation configuration 400, selection configuration 500, and standard selections 600. Messaging application 242 may deliver address validations, validated address lists, and notifications to employees that a validated address has been delivered to a requestor.

Existing list validation 244 may provide for comparison of an existing address list to addresses in one or more payroll databases to return a list of addresses that match a name and an address in one or more payroll databases. Security application 246 may only allow entities that have been authorized by outside authorization application 248 to have access to web page 290 to make requests for address validation.

Outside authorization application 248 receives initial requests for address validation service and determines whether or not to grant service. For example, outside authorization application 248 may search local, state, and federal public information to determine that the entity requesting the address validation service is a lawful entity and that the address validation will not be used for an unlawful purpose. Outside authorization application 248 may use machine intelligence 218 to gather additional information for approval of a requesting entity.

Figure 13:
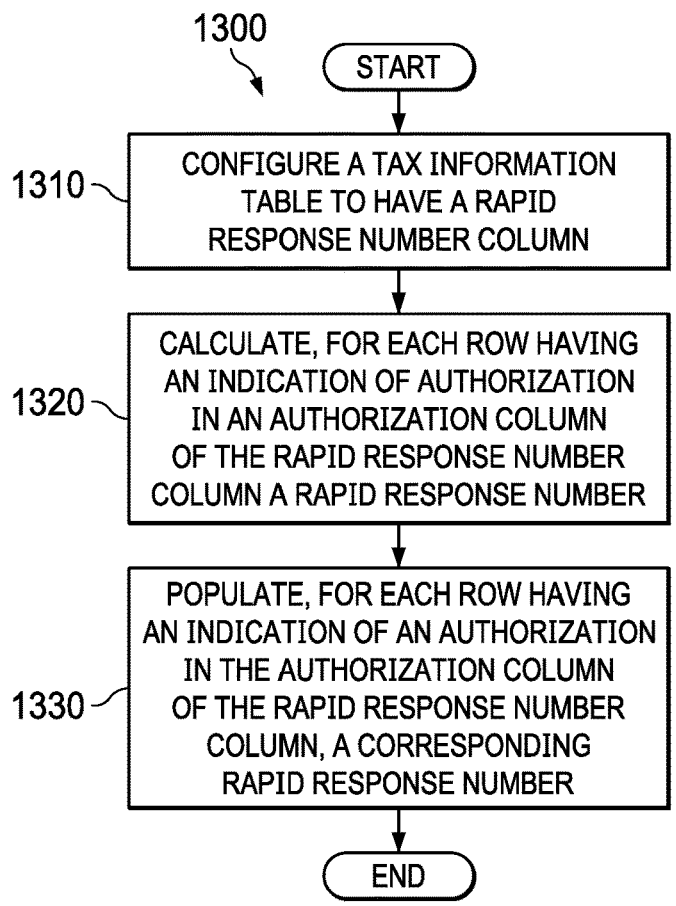
FIG. 13 is a flowchart of a process for creating an augmented tax table in accordance with an illustrative embodiment.
Figure 14:
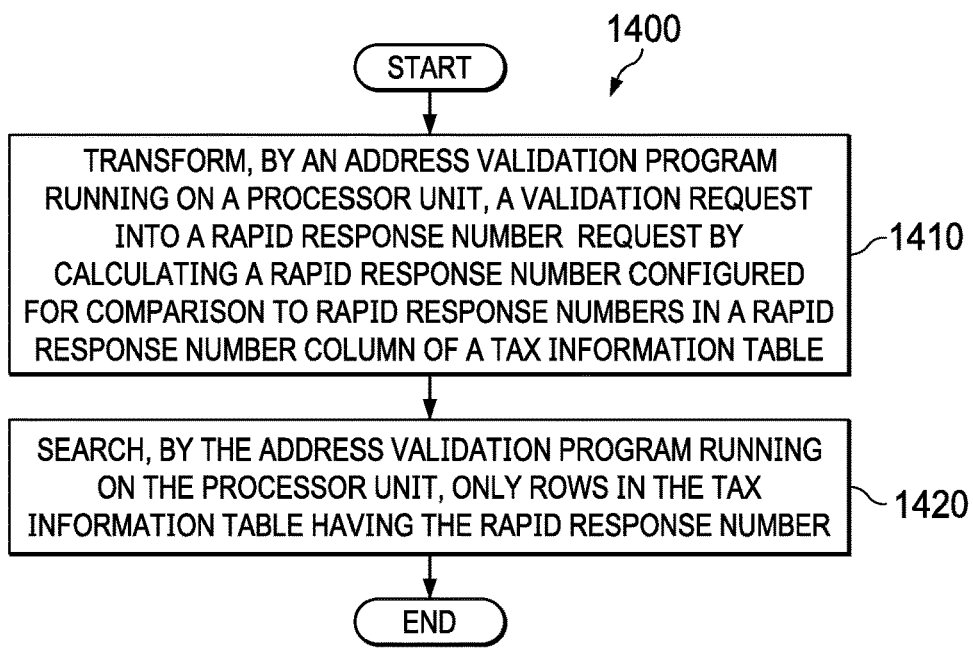
FIG. 14 is a flowchart of a process for transforming an address validation request into a rapid response number request in accordance with an illustrative embodiment.

Rapid response application 250 augments a tax table with rapid response number columns in accordance with process 1300 in FIG. 13 and process 1400 in FIG. 14 so that for each row in the tax table that has an authorization indication, rapid response application 250 calculates a rapid response number, and for each request for an address validation, calculates a rapid response number from request fields so that the rapid response number of the request may be compared to rapid response numbers in the rows of the tax table.

Address change service application 252 receives a request for an address change service from an employee. The request may be entered by the employee at address change service portal 294 of web page 290. Address change service portal 294 is provided by address change service application 252 in accordance with selection configuration 500 in FIG. 5 and standard selections 600 in FIG. 6.

Data processing system 202 may be connected to address validation cache 254 and to address validation program 230 so that data copied from tax tables by address validation program 230 may be sent to a dedicated cache such as address validation cache 254 for delivery by messaging application 242 without using additional space in memory or storage.

Payroll application 220 comprises payment 222, statement preparation 224, W-2 preparation 226, and coordination with address validation application 228. Connections application 280 comprises internet 282, wireless 284, and others 286.

Devices 270 comprise non-mobile devices 272 and mobile devices 274. Non-mobile devices 272 may be non-mobile processing systems such as desktop computers or processing systems using hard wired connections or landlines. Mobile devices 274 may be laptop computers, mobile phones, and devices having portable processors connected by wireless connections.

Web page 290 comprises address validation portal 292, address change service portal 294, validated list order portal 296, and response field 298. Payroll databases 260 comprise first company payroll database 262 including W-2 data 263, second company payroll database 264 including W-2 data 265, and third company payroll database 266 including W-2 data 267.

Computer system 200 solves a technical problem of reducing an amount of resources required for direct mailing of notifications or advertising. The illustrative embodiments recognize and take into account that resources include time and money. Processor time, memory and storage usage, and internet bandwidth have a cost so that, the more processor time, the more memory and storage usage, and the more internet bandwidth that may be consumed, the greater the cost to deliver direct mail so that an amount realized through payment for the direct mail will be lessened by the amount spent to deliver advertising to incorrect addresses and the increased size of mailing necessary to take into account a number of incorrect addresses. Therefore, computer system 200 in FIG. 2 reduces processor time, memory and storage usage, and internet bandwidth.

As used herein, "resources" shall mean one or more of the following: (1) the amount of processor time and internet bandwidth used, (2) the amount of memory and storage required, and (3) the amount of time to prepare one or both of a validated address and a validated address list.

Resources are represented below in FIG. 2 by data processing system 202 and in FIG. 18 by data processing system 1800. Processor time may be an amount of time processor unit 1804 in FIG. 18 spends executing instructions for one or more components of address validation program 230, for executing instructions for one or more components of machine intelligence 210, and for executing instructions for the processes set forth in FIG. 6 through FIG. 17. Reductions in memory and storage may be reductions in memory 1806 and persistent storage 1808 in FIG. 18. Moreover, reductions in storage may be reductions in program code 1824, computer-readable storage media 1826, and computer-readable signal media 1828 in FIG. 18.

Thus, in one illustrative example, one or more technical solutions are present that overcome a technical problem of reducing resources in address validation. In the illustrative examples, a required amount of data to provide a direct mail marketing list is minimized by using source data from a tax table in a payroll service provider's payroll database. Furthermore, resources are saved because a separate database or table is not required for preparing a validated address list. Rather, an existing tax table is used for address data, and the tax table is the source with the highest probability of having up-to-date and correct addresses. Furthermore, providing the validated address list from the tax table eliminates a need to provide more addresses than required to allow for failed delivery to incorrect or out-of-date addresses. In addition, a validated address list, which can have less data but more accurate data, requires less bandwidth to deliver to a requestor. In the illustrative embodiments, a high accuracy is achieved by using tax tables such was W-2 data 263, W-2 data 265, and W-2 data 267.

Additional resources are saved in regard to processor time. In the illustrative examples, a request process is streamlined by use of a web page such as web page 290. Use of a dedicated cache, such as address validation cache 254, may save processor time as packets of a validated address list, or a validated address can be stored in address validation cache 254 until complete and ready for delivery by messaging application 242. Processor time for searching tax tables and copying data is reduced by configuring an existing tax table with additional columns to speed up the searching, locating, and copying of data. For example, in FIG. 10, augmented tax table 1000 has authorization column 1002 and rapid response number column 1004. Search requests are formed with a rapid response number, such as rapid response number 712 in search request 710, rapid response number 732 in search request 730, and rapid response number 752 in search request 750 in FIG. 7. Address validation program 230 may search augmented tax table 1000 in FIG. 10 by only looking to the rows with an authorization indication, and then only looking to the rows with matching rapid response numbers. In this manner, processor time for a processor unit, such as processor unit 1804 in FIG. 18, is reduced. Thus, the illustrative embodiments discussed above, as well as other illustrative embodiments discussed herein, make computer system 200 a special computer system that solves a technical problem of reducing an amount of resources required for preparing validated addresses and validated address lists in a manner that cannot be performed by any other computer system that does not have the programming and connections to a payroll database disclosed in the illustrative embodiments.

Turning to FIG. 3, address validation system 300 is depicted in accordance with an illustrative embodiment. Participating businesses 310 may include direct mail advertising business 312. Address validation provider 320 may be an owner or operator of computer system 200 in FIG. 2 providing payroll services. Address change service 330 may be any of the address change services described herein for participating employers 332 and participating employees 334.

Turning to FIG. 4, address validation configuration 400 may be a web screen for entry of data to configure a number of services. In an illustrative example, address validation configuration 400 may comprise individual address configuration 410, validated list order configuration 430, and existing list configuration 440. Individual address configuration 410 may comprise name 412, last known address 414, last known zip code 418, birthdate 420, social security number 422, and last known employer 424. Validated list order configuration 430 may comprise size of list (or lists) 432, zip code (or codes) 434, and salary range (or ranges) 436. Existing list validation 440 may comprise a mechanism for attaching an existing list for transmittal to computer system 200 in FIG. 2.

Figure 5:
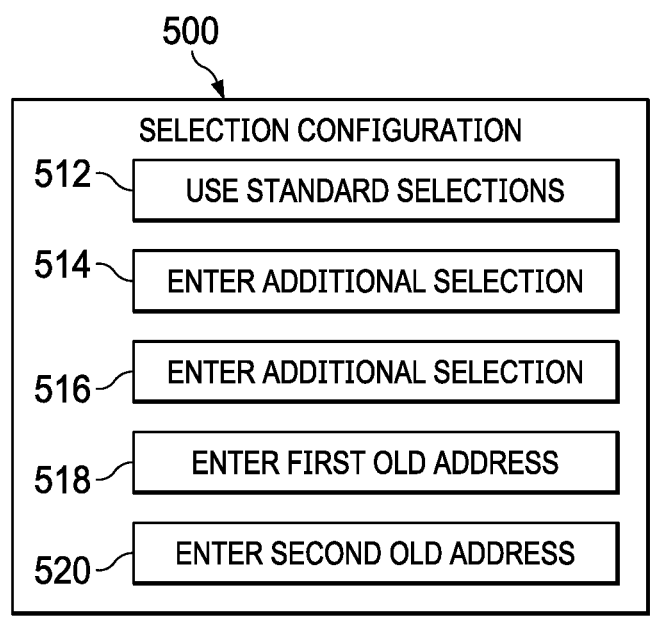
FIG. 5 is a block diagram of an employee address change selection web page in accordance with an illustrative embodiment.

Turning to FIG. 5, selection configuration 500 may be a web screen for entry of selections and data by an employee who has requested an address change service using address change service portal 294 in FIG. 2. Using selection configuration 500, an employee may select "use standard selections" 512. If the employee selects "use standard selections" 512, a screen such as standard selections 600 in FIG. 6 may be provided. The employee may enter additional selections using "enter additional selection" 514 and "enter additional selection" 516. Moreover, the employee may enter a number of old addresses such as "enter first old address" 518 and "enter second old address" 520 that may be used to aid in searches by requests such as search request 750 in FIG. 7, where one or more old addresses are available to a requestor.

Figure 6:
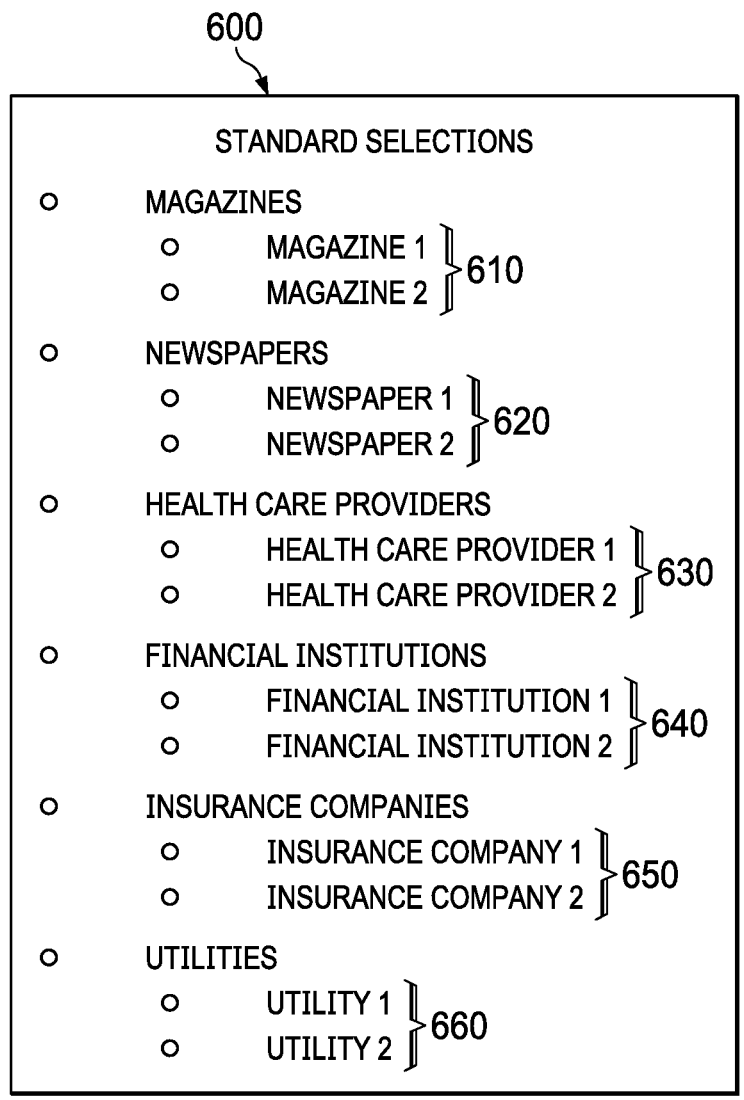
FIG. 6 is an illustration of an employee standard selections web page in accordance with an illustrative embodiment.

Turning to FIG. 6, standard selections 600 may be a web screen with a number of selections for addresses to be kept updated with changes of address for an employee. In the illustrative example of standard selections 600, the employee may select magazines 610, newspapers 620, health care providers, 630, financial institutions 640, insurance companies 650, and utilities 660. In the illustrative example, the employee may select magazines 610 and a list of common magazines may be provided which may be selected. In a like manner, a list of common ones of newspapers 620 may be provided, a list of common ones of health care providers 630 may be provided, a list of common ones of financial institutions 640 may be provided, a list of common ones of insurance companies 650 may be provided, and a list of common ones of utilities 660 may be provided.

Turning to FIG. 7, a number of requests for address validation are depicted in accordance with a number of illustrative embodiments. Requests 700 may be in one or more formats. Requests 700 are for address validation of individuals and not for validated address lists. In an illustrative embodiment, search request 710 comprises rapid response number 712, first name 714, middle initial or name 716, last name 718, and identification 720. In another illustrative embodiment, search request 730 may comprise rapid response number 732, first name 734, middle initial or name 736, last name 738, and blank (no identification) 740. In another illustrative embodiment, search request 750 may comprise rapid response number 752, first name 754, middle initial or name 756, last name 758, first old address 760, and second old address 762. The illustrative embodiments depicted in FIG. 7 are presented by way of example and not by way of limitation. Persons skilled in the art recognize and take into account that requests may be formatted in a number of ways. For example, identification 720 in search request 710 may be one or more of birthdate 420, social security number 422, and last known employer 424 in individual address configuration 410 in FIG. 4. Requests may be formatted without a rapid response number. Requests such as request 700 would not be used. Rather, one or more criteria would be specified pursuant to validated list order configuration 430 or existing list validation 440 in FIG. 4.

Turning to FIG. 8, code table 800 comprises alphabet 810 and corresponding numerals 820. In the illustrative example of FIG. 8, a substitution table is provided for use with an algorithm set forth in examples 900 in FIG. 9. The substitution table provides a different number for each letter of the alphabet.

Turning to FIG. 9, examples 900 are shown of calculations for rapid response numbers in accordance with an illustrative embodiment. Examples 900 in FIG. 9 are an example of an algorithm used to calculate rapid response numbers. Turning to example 910, using code table 800 in FIG. 8, each number associated with the first three letters of a first name are identified and added together. Thus, for the first name John, the number 10 is identified for J, the number 15 is identified for O, and the number 8 is identified for H. The three identified numbers are added for a first total of 33. Next, the first three letters of the last name are used. The number 4 is identified for D, the number 15 is identified for O, and the number 5 is identified for E. The three identified numbers for the last name are added together for a second total of 24. The first total and the second total are added together for a third total of 57. The third total is the rapid response number that is entered in rapid response number column 1004 in row 1026 for John Z. Doe in FIG. 10. Example 920, 930, 940, and 950 are calculated in a like manner.

Turning to FIG. 10, augmented tax table 1000 is depicted in accordance with an illustrative embodiment. Augmented tax table 1000 comprises a number of columns and rows. The columns include authorization column 1002, rapid response number column 1004, first name column 1006, middle initial or name column 1008, last name column 1010, address column 1014, Old1 column 1022, and Old2 column 1024. Old1 column 1022 represents a first old address, and Old2 column 1024 represents a second old address. Of the nine rows depicted in augmented tax table 1000, rows 1026, 1028, 1030, 1032, and 1034 have been marked with an "X" to indicate that authorization has been granted. The remaining rows have no marking. Any suitable indication that authorization has been granted may be placed in authorization column 1002 where the employee whose data resides in a row has granted authorization to use the data for address verification. For each row marked "X," a rapid response number is entered in the "RAPID" column, or rapid response number column 1004. In the illustrative example of FIG. 10, each rapid response number has been calculated using code table 800 from FIG. 8 and the application of the algorithm in examples 900 in FIG. 9. Rapid response number "57" in rapid response number column 1004 and row 1026 corresponds to example 910 in FIG. 9. Rapid response number "42" in rapid response number column 1004 and row 1028 corresponds to example 920 in FIG. 9. Rapid response number "71" in rapid response number column 1004 and row 1030 corresponds to example 930 in FIG. 9. Rapid response number "70" in rapid response number column 1004 and row 1032 corresponds to example 940 in FIG. 9. Rapid response number "64" in rapid response number column 1004 and row 1034 corresponds to example 950 in FIG. 9. Address column 1014 may be populated with the current address for each row representing an employee in the tax table. In an illustrative example, augmented tax table 1000 may be one of W-2 data 253, W-2 data 265, and W-2 data 267 in FIG. 2. Old1 column 1022, or first old address, and Old2 column 1024, or second old address, may be used by address validation program 230 in FIG. 2 using a request format such as search request 750 having first old address 760 and second old address 762 in FIG. 7.

Figure 11:
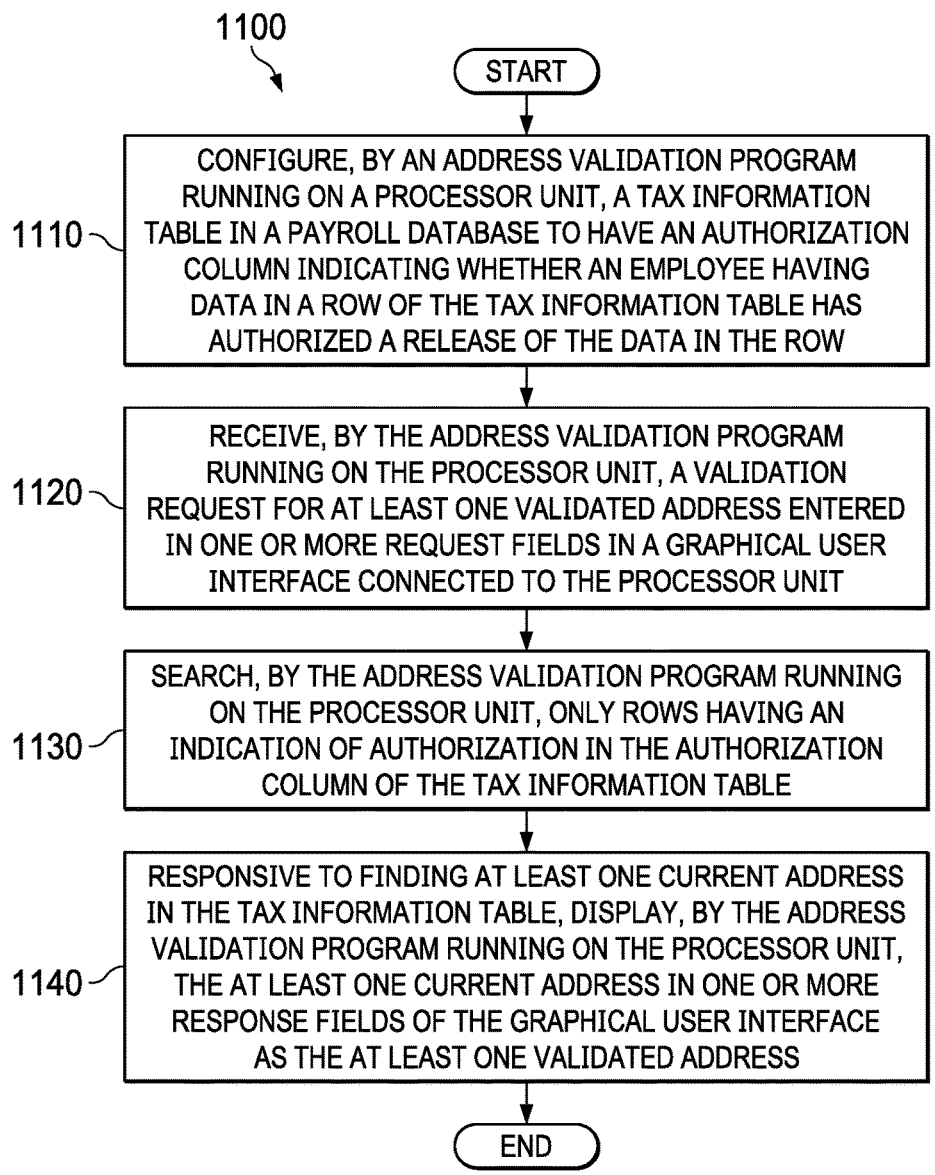
FIG. 11 is a flowchart of a process for reducing an amount of resources required for address validation in accordance with an illustrative embodiment.

Turning to FIG. 11, a flowchart of a process for reducing an amount of resources required for address validation is depicted in accordance with an illustrative embodiment. Process 1100 can be implemented in software, hardware, or a combination of the two. When software is used, the software comprises program code that can be loaded from a storage device and run by a processor unit in a computer system such as computer system 200 in FIG. 2. Computer system 200 may reside in a network data processing system such as network data processing system 100 in FIG. 1. For example, computer system 200 may reside on one or more of server computer 104, server computer 106, client computer 110, client computer 112, and client computer 114 connected by network 102 in FIG. 1. Process 1100 starts. An address validation program running on a processor unit, configures a tax information table in a payroll database to have an authorization column indicating whether an employee having data in a row of the tax information table has authorized a release of the data in the row (step 1110). The address validation program may be address validation program 230 in FIG. 2. The tax information table may be a tax information table such as W-2 data 263, W-2 data 265, and W-2 data 267 in FIG. 2 and augmented tax table 1000 in FIG. 10. The payroll database may be payroll databases 260 in FIG. 2. The authorization column may be authorization column 1002 in FIG. 10. Next, the address validation program running on the processor unit receives a validation request for at least one validated address entered in one or more request fields in a graphical user interface connected to the processor unit (step 1120). The graphical user interface may be address validation portal 292 in web page 290 in FIG. 2. The validation request may be in a format such as one of requests 700 in FIG. 7. Afterwards, the address validation program running on the processor unit searches only rows having an indication of authorization in the authorization column of the tax information table (step 1130). The rows having an indication of authorization may be rows such as row 1026, row 1028, row 1030, row 1032, and row 1034 in augmented tax table 1000 in FIG. 10. In response to finding at least one current address in the tax information table, the address validation program running on the processor unit displays at least one current address in one or more response fields of the graphical user interface as the at least one validated address (step 1140). The response field may be response field 298 in web page 290 in FIG. 2. Process 1100 stops.

Figure 12:
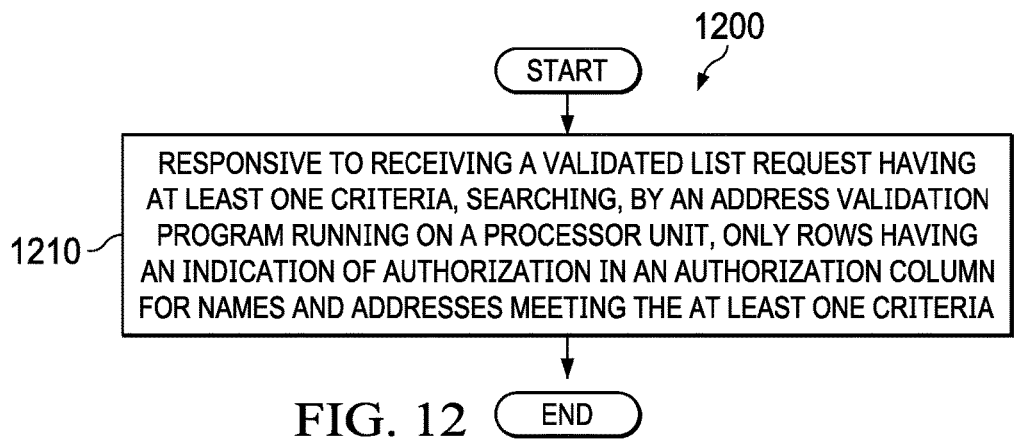
FIG. 12 is a flowchart of a process for responding to a validated address list request in accordance with an illustrative embodiment.

Turning to FIG. 12, a flowchart of a process for responding to a validated list request is depicted in accordance with an illustrative embodiment. Process 1200 can be implemented in software, hardware, or a combination of the two. When software is used, the software comprises program code that can be loaded from a storage device and run by a processor unit in a computer system such as computer system 200 in FIG. 2. Computer system 200 may reside in a network data processing system such as network data processing system 100 in FIG. 1. For example, computer system 200 may reside on one or more of server computer 104, server computer 106, client computer 110, client computer 112, and client computer 114 connected by network 102 in FIG. 1.

Process 1200 starts. In response to receiving a validated list request having at least one criteria, an address validation program running on a processor unit searches only rows having an indication of authorization in an authorization column for names and addresses meeting the at least one criteria (step 1210). The validated list request may be entered on validated list order portal 296 in web page 290 in FIG. 2. The validated list request may be configured in accordance with a screen such as validated list order configuration 430 in FIG. 4. A requestor may specify criteria such as size of list (or lists) 432, zip code (or codes) 434, and salary range (or ranges) 436. In another illustrative embodiment, an existing list validation may be requested using existing list validation 440 in FIG. 4. Process 1200 stops.

Turning to FIG. 13, a flowchart of a process for configuring an augmented tax table is depicted in accordance with an illustrative embodiment. Process 1300 can be implemented in software, hardware, or a combination of the two. When software is used, the software comprises program code that can be loaded from a storage device and run by a processor unit in a computer system such as computer system 200 in FIG. 2. Computer system 200 may reside in a network data processing system such as network data processing system 100 in FIG. 1. For example, computer system 200 may reside on one or more of server computer 104, server computer 106, client computer 110, client computer 112, and client computer 114 connected by network 102 in FIG. 1.

Process 1300 starts. A tax information table is configured to have a rapid response number column (step 1310). The tax information table may be a tax information table such as W-2 data 263, W-2 data 265, and W-2 data 267 in FIG. 2, and augmented tax table 1000 in FIG. 10. Augmented tax table 1000 in FIG. 10 has rapid response number column 1004. For each row having an indication of authorization in an authorization column of the rapid response number column, a rapid response number is calculated (step 1320). In augmented tax table 1000, row 1026, row 1028, row 1030, row 1032, and row 1034 each have an indication of authorization. For the each row having the indication of an authorization in the authorization column, the rapid response number column is populated with a corresponding rapid response number (step 1330). In augmented tax table 1000, row 1026, row 1028, row 1030, row 1032, and row 1034 each have a rapid response number corresponding to examples in FIG. 9. Process 1300 stops.

Turning to FIG. 14, a flowchart of a process for transforming an address validation request into a rapid response number request is depicted in accordance with an illustrative embodiment. Process 1400 can be implemented in software, hardware, or a combination of the two. When software is used, the software comprises program code that can be loaded from a storage device and run by a processor unit in a computer system such as computer system 200 in FIG. 2. Computer system 200 may reside in a network data processing system such as network data processing system 100 in FIG. 1. For example, computer system 200 may reside on one or more of server computer 104, server computer 106, client computer 110, client computer 112, and client computer 114 connected by network 102 in FIG. 1.

Process 1400 starts. An address validation program running on a processor unit transforms a validation request into a rapid response number request by calculating a rapid response number configured for comparison to rapid response numbers in a rapid response number column of a tax information table (step 1410). The rapid response numbers are calculated using code table 800 in FIG. 8 and the algorithm shown in each of the examples in FIG. 9. Population of the rapid response numbers in FIG. 9 is shown in FIG. 10. Next, the address validation program running on the processor unit searches only rows in the tax information table having the rapid response number (step 1420). Since only rows having an indication of authorization are provided with rapid response numbers, the time involved in searching a tax information table is reduced. Process 1400 stops.

Figure 15:
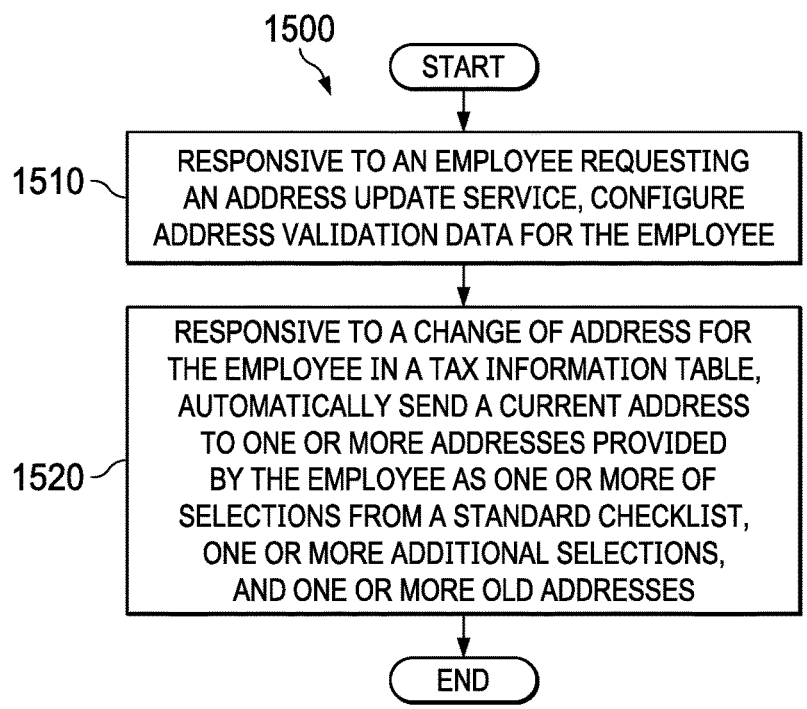
FIG. 15 is an illustration of a flowchart of a process for providing an address change service in accordance with an illustrative embodiment.

Turning to FIG. 15, a flowchart of a process for providing an address change service is depicted in accordance with an illustrative embodiment. Process 1500 can be implemented in software, hardware, or a combination of the two. When software is used, the software comprises program code that can be loaded from a storage device and run by a processor unit in a computer system such as computer system 200 in FIG. 2. Computer system 200 may reside in a network data processing system such as network data processing system 100 in FIG. 1. For example, computer system 200 may reside on one or more of server computer 104, server computer 106, client computer 110, client computer 112, and client computer 114 connected by network 102 in FIG. 1.

Process 1500 starts. In response to an employee requesting an address change service, address validation data for the employee is configured (step 1510). The address change service may be requested by the employee using address change service portal 294 in web page 290 in FIG. 2. In response to a change of address for the employee in a tax information table, a current address is automatically sent to one or more addresses provided by the employee as one or more of selections from a standard checklist, one or more additional selections, and one or more old addresses (step 1520). The one or more selections from a standard checklist, the one or more additional selections, and the one or more old addresses may be configured using selection configuration 500 in FIG. 5. The current address may be sent to the one or more addresses provided by the employee by messaging application 242 in FIG. 2. The one or more addresses may be provided in accordance with a standard checklist by a selection of "use standard selections" 512 in FIG. 5. In addition or alternatively, the employee may enter one or more of "enter additional selection" 514, "enter additional selection" 516, "enter first old address" 518, and "enter second old address" 520 in a screen such as selection configuration 500 in FIG. 5. Process 1500 stops.

Figure 16:
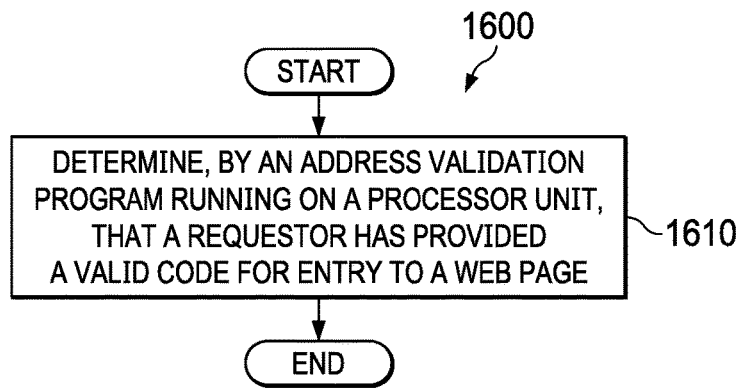
FIG. 16 is a flowchart of a process for ensuring that an outside entity has provided a code to enter a web page to order services in accordance with an illustrative embodiment.

Turning to FIG. 16, a flowchart of a process for ensuring outside entity authorization is depicted in accordance with an illustrative embodiment. Process 1600 can be implemented in software, hardware, or a combination of the two. When software is used, the software comprises program code that can be loaded from a storage device and run by a processor unit in a computer system such as computer system 200 in FIG. 2. Computer system 200 may reside in a network data processing system such as network data processing system 100 in FIG. 1. For example, computer system 200 may reside on one or more of server computer 104, server computer 106, client computer 110, client computer 112, and client computer 114 connected by network 102 in FIG. 1.

Process 1600 starts. An address validation program running on a processor unit determines that a requestor has provided a valid code for entry to a web page (step 1610). The web page may be web page 290 in FIG. 2. The address validation program may be address validation program 230 in FIG. 2, and address validation program 230 may use security application 246 to determine if the requestor has provided the valid code. Process 1600 stops.

Figure 17:
FIG. 17 is a flowchart of a process of sending a notification in accordance with an illustrative embodiment.

Turning to FIG. 17, a flowchart of a process for notifying an employee that an address validation has been sent to a requestor is depicted in accordance with an illustrative embodiment. Process 1700 can be implemented in software, hardware, or a combination of the two. When software is used, the software comprises program code that can be loaded from a storage device and run by a processor unit in a computer system such as computer system 200 in FIG. 2. Computer system 200 may reside in a network data processing system such as network data processing system 100 in FIG. 1. For example, computer system 200 may reside on one or more of server computer 104, server computer 106, client computer 110, client computer 112, and client computer 114 connected by network 102 in FIG. 1.

Process 1700 starts. An address validation program running on a processor unit sends an email to an employee that a current address has been sent to a requestor (step 1710). The email may be sent by messaging application 242 in FIG. 2. Process 1700 stops.

Figure 18:
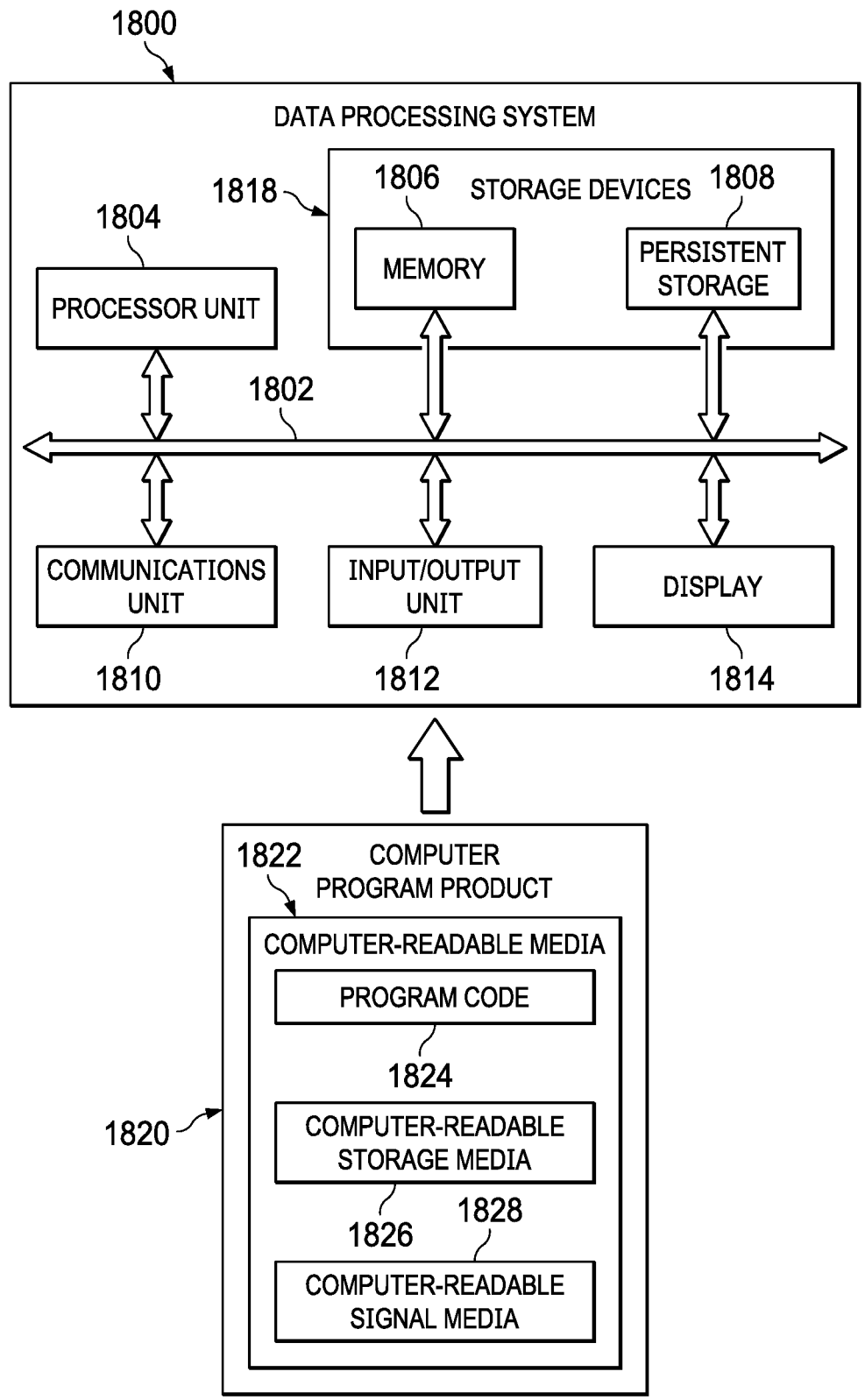
FIG. 18 is a block diagram of a data processing system in accordance with an illustrative embodiment.

Turning now to FIG. 18, a block diagram of a data processing system is depicted in accordance with an illustrative embodiment. Data processing system 1800 may be used to implement computer system 200 in FIG. 1. In this illustrative example, data processing system 1800 includes communications framework 1802, which provides communications between processor unit 1804, memory 1806, persistent storage 1808, communications unit 1810, input/output unit 1812, and display 1814. In this example, communications framework 1802 may take the form of a bus system.

Processor unit 1804 serves to execute instructions for software that may be loaded into memory 1806. Processor unit 1804 may be a number of processors, a multi-processor core, or some other type of processor, depending on the particular implementation.

Memory 1806 and persistent storage 1808 are examples of storage devices 1818. A storage device is any piece of hardware that is capable of storing information, such as, for example, without limitation, at least one of data, program code in a functional form, or other suitable information either on a temporary basis, a permanent basis, or both on a temporary basis and a permanent basis. Storage devices 1818 may also be referred to as computer-readable storage devices in these illustrative examples. Memory 1806, in these examples, may be, for example, a random access memory or any other suitable volatile or non-volatile storage device. Persistent storage 1808 may take various forms, depending on the particular implementation.

For example, persistent storage 1808 may contain one or more components or devices. For example, persistent storage 1808 may be a hard drive, a solid state hard drive, a flash memory, a rewritable optical disk, a rewritable magnetic tape, or some combination of the above. The media used by persistent storage 1808 also may be removable. For example, a removable hard drive may be used for persistent storage 1808.

Communications unit 1810, in these illustrative examples, provides for communications with other data processing systems or devices. In these illustrative examples, communications unit 1810 is a network interface card.

Input/output unit 1812 allows for input and output of data with other devices that may be connected to data processing system 1800. For example, input/output unit 1812 may provide a connection for user input through at least one of a keyboard, a mouse, or some other suitable input device. Further, input/output unit 1812 may send output to a printer. Display 1814 provides a mechanism to display information to a user.

Instructions for at least one of the operating system, applications, or programs may be located in storage devices 1818, which are in communication with processor unit 1804 through communications framework 1802. The processes of the different embodiments may be performed by processor unit 1804 using computer-implemented instructions, which may be located in a memory, such as memory 1806.

These instructions are referred to as program code, computer usable program code, or computer-readable program code that may be read and executed by a processor in processor unit 1104. The program code in the different embodiments may be embodied on different physical or computer-readable storage media, such as memory 1806 or persistent storage 1808.

Program code 1824 is located in a functional form on computer-readable media 1822 that is selectively removable and may be loaded onto or transferred to data processing system 1800 for execution by processor unit 1804. Program code 1824 and computer-readable media 1822 form computer program product 1820 in these illustrative examples. In one example, computer-readable media 1822 may be computer-readable storage media 1826 or computer-readable signal media 1126.

In these illustrative examples, computer-readable storage media 1826 is a physical or tangible storage device used to store program code 1824 rather than a medium that propagates or transmits program code 1824.

Alternatively, program code 1824 may be transferred to data processing system 1800 using computer-readable signal media 1828. Computer-readable signal media 1828 may be, for example, a propagated data signal containing program code 1824. For example, computer-readable signal media 1828 may be at least one of an electromagnetic signal, an optical signal, or any other suitable type of signal. These signals may be transmitted over at least one of communications links, such as wireless communications links, an optical fiber cable, a coaxial cable, a wire, or any other suitable type of communications link.

The different components illustrated for data processing system 1800 are not meant to provide architectural limitations to the manner in which different embodiments may be implemented. The different illustrative embodiments may be implemented in a data processing system including components in addition to or in place of those illustrated for data processing system 1800. Other components shown in FIG. 18 can be varied from the illustrative examples shown. The different embodiments may be implemented using any hardware device or system capable of running program code 1824.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. For example, although the illustrative examples have been described with respect to supplying human resources profile information for generating advertising, other illustrative examples may be applied to personalizing web pages generated by web servers. In this manner, the different steps illustrated may be used to provide web pages to users that are more personalized. Web pages may be modified or dynamically generated using the human resources profile information.

Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method for reducing an amount of resources required for address validation, the computer-implemented method comprising:
    configuring, by an address validation program running on a processor unit, a tax information table in a payroll database to have an authorization column indicating whether an employee having data in a row of the tax information table has authorized release of data in the row;
    receiving, by the address validation program running on a processor unit, a validation request for at least one validated address entered in one or more request fields in a graphical user interface connected to the processor unit;
    searching, by the address validation program running on the processor unit, only rows having an indication of authorization in the authorization column of the tax information table;
    responsive to finding at least one current address in the tax information table, displaying, by the address validation program running on the processor unit, the at least one current address in one or more response fields of the graphical user interface as the at least one validated address;
    configuring the tax information table to have a rapid response number column;
    calculating for each row having the indication of authorization in the authorization column of the rapid response number column, a rapid response number; and
    populating, for each row having the indication of authorization in the authorization column, the rapid response number column with a corresponding rapid response number.

2. The computer-implemented method of claim 1, further comprising:
    responsive to receiving a validated list request having at least one criteria, searching, by the address validation program running on the processor unit, only rows having the indication of authorization in the authorization column for names and addresses meeting the criteria.

3. The computer-implemented method of claim 2, wherein the criteria is one of a number of addresses desired in the validated list request, a number of zip codes, and a number of salary ranges.

4. The computer-implemented method of claim 1, further comprising:
    transforming, by the address validation program running on the processor unit, the validation request into a rapid response number request by calculating the rapid response number configured for comparison to rapid response numbers in the rapid response number column of the tax information table; and
    searching, by the address validation program running on the processor unit, only rows in the tax information table having the rapid response number.

5. The computer-implemented method of claim 1, further comprising:
    determining, by the address validation program running on the processor unit, that a requestor has provided a valid code for entry to a web page; and
    sending, by the address validation program running on the processor unit, an email to the employee that the current address has been sent to the requestor.

6. The computer-implemented method of claim 1, further comprising:
    responsive to the employee requesting an address change service, configuring address validation data for the employee; and
    responsive to a change of address for the employee in the tax information table, automatically sending a current address to one or more addresses provided by the employee as one or more of selections from a standard checklist, one or more additional selections, and one or more old addresses.

7. An apparatus for reducing an amount of resources required for address validation comprising:
    a computer system connected to a network, a graphical user interface, a processor unit, and a payroll database having a tax information table;
    computer program instructions stored in a computer-readable storage media and configured to cause the processor unit to configure a tax information table in a payroll database to have an authorization column indicating whether an employee having data in a row of the tax information table has authorized release of data in the row; to receive a validation request for at least one validated address entered in one or more request fields in a graphical user interface connected to the processor unit; to search only rows having an indication of authorization in the authorization column of the tax information table; and, responsive to finding the at least one validated addresses in the tax information table, to display a current address in one or more response fields of the graphical user interface as the at least one validated address;
    computer program instructions stored in a computer-readable storage media and configured to cause the processor unit to configure the tax information table to have a rapid response number column;
    computer program instructions stored in the computer-readable storage media and configured to cause the processor unit to calculate for each row having the indication of authorization in the authorization column of the rapid response number column, a rapid response number; and
    computer program instructions stored in the computer-readable storage media and configured to cause the processor unit to populate, for each row having the indication of authorization in the authorization column, the rapid response number column with a corresponding rapid response number.

8. The apparatus of claim 7, further comprising:
    computer program instructions stored in the computer-readable storage media and configured to cause the processor unit, responsive to receiving a validated list request having at least one criteria, to search only rows having the indication of authorization in the authorization column for names and addresses meeting the at least one criteria and to return a validated list comprising names and addresses.

9. The apparatus of claim 8, wherein the at least one criteria is one of a number of addresses desired in the validated list, a number of zip codes, and a number of pay ranges.

10. The apparatus of claim 7, further comprising:

computer program instructions stored in the computer-readable storage media and configured to cause the processor unit to transform the validation request into a rapid response number request by calculating the rapid response number configured for comparison to rapid response numbers in the rapid response number column of the tax information table; and computer program instructions stored in the computer-readable storage media and configured to cause the processor unit to search only rows in the tax information table having the rapid response number.

11. The apparatus of claim 7, further comprising:

computer program instructions stored in the computer-readable storage media and configured to cause the processor unit to determine that a requestor has provided an authorization; and computer program instructions stored in the computer-readable storage media and configured to cause the processor unit to send an email to the employee that the current address has been sent to the requestor.

12. The apparatus of claim 7, further comprising:

computer program instructions stored in the computer-readable storage media and configured to cause the processor unit, responsive to the employee requesting an address change service, to configure address validation data for the employee; and computer program instructions stored in the computer-readable storage media and configured to cause the processor unit, responsive to a change of address for the employee in the tax information table, to send automatically a current address to one or more addresses provided by the employee as one or more of selections from a standard checklist, one or more additional selections, and one or more old addresses.

13. A computer program product for reducing an amount of resources required for address validation comprising a non-transitory computer-readable storage media storing computer instructions therein, the computer program instructions, upon execution by a computing system, causing the computing system to perform steps comprising:

configuring a tax information table in a payroll database to have an authorization column indicating whether an employee having data in a row of the tax information table has authorized release of data in the row;

receiving a validation request for at least one validated address entered in one or more request fields in a graphical user interface connected to the processor unit;

searching only rows having an indication of authorization in the authorization column of the tax information table;

responsive to finding the at least one validated addresses in the tax information table, displaying a current address in one or more response fields of the graphical user interface as the at least one validated address;

configuring the tax information table to have a rapid response number column;

calculating for each row having an indication of authorization in the authorization column of the rapid response number column, a rapid response number; and populating, for each row having the indication of authorization in the authorization column, the rapid response number column with a corresponding rapid response number.

14. The computer program product of claim 13, further comprising:

responsive to receiving a validated list request having at least one criteria, searching only rows having the indication of authorization in the authorization column for names and addresses meeting the criteria; and wherein the criteria is one of a number of addresses desired in the validated list request, a number of zip codes, and a number of pay ranges.

15. The computer program product of claim 13, further comprising:

transforming the validation request into a rapid response number request by calculating a rapid response number configured for comparison to rapid response numbers in the authorization column of the tax information table; and searching only rows in the tax information table having the rapid response number.

16. The computer program product of claim 13, further comprising:

sending an email to the employee that the current address has been sent to a requestor.

17. The computer program product of claim 13, further comprising:

determining that a requestor has provided an authorization.

* * * * *